United States Patent
Ros Giralt

(10) Patent No.: US 12,388,764 B2
(45) Date of Patent: Aug. 12, 2025

(54) MULTIPLE BATCH SCHEDULING IN A NETWORK

(71) Applicant: QUALCOMM Incorporated, San Diego, CA (US)

(72) Inventor: Jordi Ros Giralt, Vilafranca del Penedes (ES)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 18/516,346

(22) Filed: Nov. 21, 2023

(65) Prior Publication Data
US 2024/0323137 A1   Sep. 26, 2024

Related U.S. Application Data

(60) Provisional application No. 63/491,435, filed on Mar. 21, 2023.

(51) Int. Cl.
*H04L 47/625* (2022.01)

(52) U.S. Cl.
CPC ................ *H04L 47/625* (2013.01)

(58) Field of Classification Search
None
See application file for complete search history.

(56) References Cited

U.S. PATENT DOCUMENTS

| | | | |
|---|---|---|---|
| 11,398,984 B1 | 7/2022 | Ros-Giralt et al. | |
| 2016/0057061 A1* | 2/2016 | Avci | H04L 43/50 370/235 |
| 2020/0120036 A1* | 4/2020 | Zhou | H04L 12/56 |
| 2022/0078130 A1* | 3/2022 | Ros-Giralt | H04L 47/745 |

FOREIGN PATENT DOCUMENTS

CN    114827782 A    7/2022

OTHER PUBLICATIONS

International Search Report and Written Opinion—PCT/US2024/012132—ISA/EPO—Apr. 3, 2024.

\* cited by examiner

*Primary Examiner* — June Sison
(74) *Attorney, Agent, or Firm* — Harrity & Harrity, LLP

(57) ABSTRACT

Various aspects of the present disclosure generally relate to wired and/or wireless communication. In some aspects, a network entity may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized. The network entity may schedule the first batch of flows and the second batch of flows based at least in part on the respective launch times. Numerous other aspects are described.

21 Claims, 12 Drawing Sheets

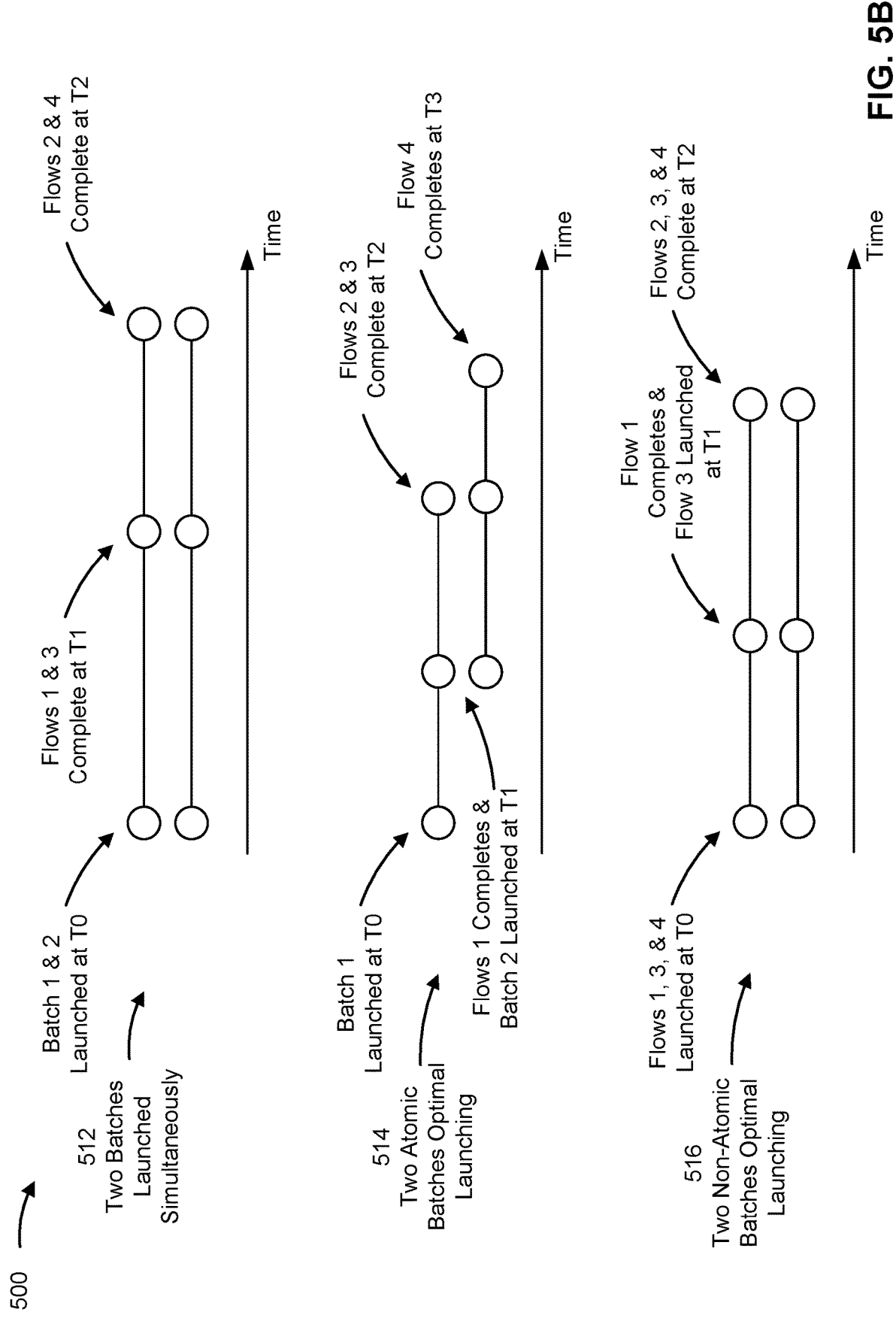

MULTIPLE BATCH SCHEDULING IN A NETWORK

CROSS-REFERENCE TO RELATED APPLICATION

This Patent application claims priority to U.S. Provisional Patent Application No. 63/491,435, filed on Mar. 21, 2023, entitled "MULTIPLE BATCH SCHEDULING IN A NETWORK," and assigned to the assignee hereof. The disclosure of the prior Application is considered part of and is incorporated by reference into this Patent Application.

FIELD OF THE DISCLOSURE

Aspects of the present disclosure generally relate to wired and/or wireless communication and to techniques and apparatuses for multiple batch scheduling in a network.

BACKGROUND

Wired and/or wireless communication systems are widely deployed to provide various telecommunication services such as telephony, video, data, messaging, computer networks, data centers, local area networks, wide area networks, and/or broadcasts, among other examples. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network entity for communication. The network entity may include one or more memories and one or more processors coupled to the one or more memories. The one or more processors may be configured to determine, based at least in part on a data flow model, a respective launch time for each flow of a first batch of flows and for each flow of a second batch of flows, such that an execution time duration for transferring at least one of the first batch of flows and the second batch of flows in a portion of a network is minimized. The one or more processors may be configured to schedule the first batch of flows and the second batch of flows based at least in part on the respective launch times.

Some aspects described herein relate to a method of communication performed by a network entity. The method may include determining, based at least in part on a data flow model, a respective launch time for each flow of a first batch of flows and for each flow of a second batch of flows, such that an execution time duration for transferring at least one of the first batch of flows and the second batch of flows in a portion of a network is minimized. The method may include scheduling the first batch of flows and the second batch of flows based at least in part on the respective launch times.

Some aspects described herein relate to a non-transitory computer-readable medium that stores a set of instructions for communication by a network entity. The set of instructions, when executed by one or more processors of the network entity, may cause the network entity to determine, based at least in part on a data flow model, a respective launch time for each flow of a first batch of flows and for each flow of a second batch of flows, such that an execution time duration for transferring at least one of the first batch of flows and the second batch of flows in a portion of a network is minimized. The set of instructions, when executed by one or more processors of the network entity, may cause the network entity to schedule the first batch of flows and the second batch of flows based at least in part on the respective launch times.

Some aspects described herein relate to an apparatus for communication. The apparatus may include means for determining, based at least in part on a data flow model, a respective launch time for each flow of a first batch of flows and for each flow of a second batch of flows, such that an execution time duration for transferring at least one of the first batch of flows and the second batch of flows in a portion of a network is minimized. The apparatus may include means for scheduling the first batch of flows and the second batch of flows based at least in part on the respective launch times.

Aspects generally include a method, apparatus, system, computer program product, non-transitory computer-readable medium, user equipment, base station, network entity, network node, wireless communication device, wired communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams of an example of multiple batch scheduling in a network, in accordance with the present disclosure.

DETAILED DESCRIPTION

Figure 1:
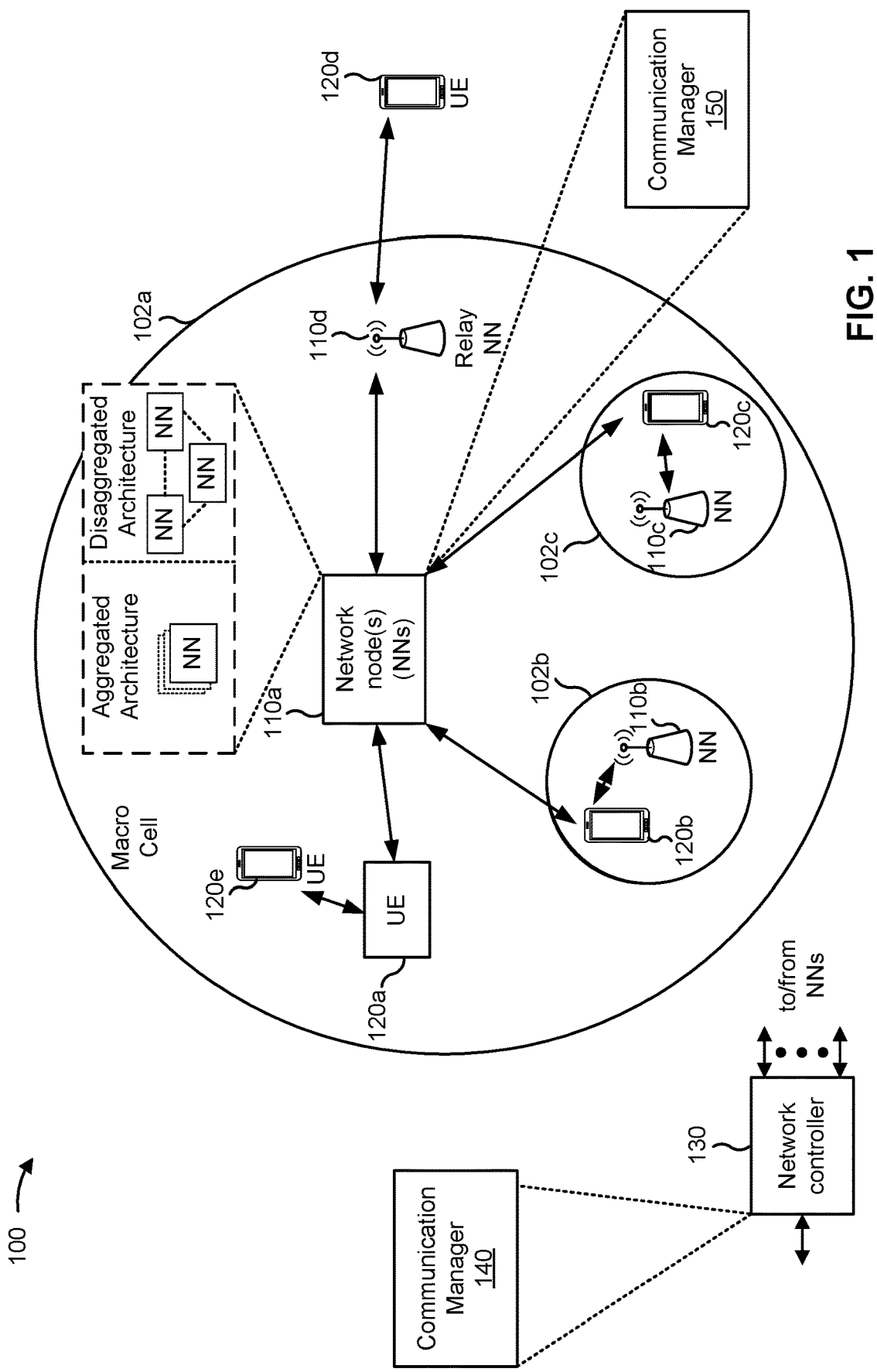
FIG. 1 is a diagram illustrating an example of a wireless network, in accordance with the present disclosure.

In some communication environments, data flows traverse one or more domains (e.g., network domains), with each domain administered by a network entity (e.g., of a network operator) that is responsible for maintaining a local domain associated with the network entity (e.g., its own domain) and ensuring interoperability with others of the one or more domains traversed by a data flow. The data flows may, for example, carry data (e.g., a data stream) between multiple user equipments (UEs), between a UE and an application server, between network nodes, between backhaul nodes, and/or between base stations. The data flows provide a pathway for the data between end nodes associated with the data (e.g., between a receiving device and a transmitting device and/or between a generating device and a receiving device, among other examples).

To manage data flows within a domain (e.g., a network of devices within a domain such as a computer network, a telecommunications core network, a telecommunications edge network, a telecommunications cloud network), a network entity of the operator may generate and/or use a data flow model. The data flow model (e.g., a bottleneck structure and/or a flow gradient graph) may include a computational graph that characterizes a state of the domain, which may allow computation of network derivatives. These derivatives may be used to optimize the domain for traffic engineering, routing, flow scheduling, capacity planning, resilience analysis, and/or network design, among other examples. To generate the data flow model for the domain (e.g., the network of devices within the domain), the network entity may use information associated with a set of links traversed by flows of the domain and a capacity of the set of links.

In some aspects described herein, a network entity may use a data flow model of a domain to schedule multiple flows through the domain. In particular, the use of the data flow model in scheduling the multiple flows may increase the execution efficiency of transferring the multiple flows through the domain. In this way, the use of the data flow model in scheduling the multiple flows may reduce the total execution time duration for transferring at least one of the multiple flows through the domain, which may increase throughput through the domain and/or may decrease latency for the multiple flows, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G). Additionally and/or alternatively, aspects described herein may be implemented in a wired network and/or a network that includes a combination of wired and wireless connections, such as a computer network, a data center, a local area network, and/or a wide area network, among other examples.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memories) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1. FR2, FR3, FR4, FR4-a, FR4-1, and/or FR5) may be modified, and techniques described herein are applicable to those modified frequency ranges.

In some aspects, a network controller 130 may include a communication manager 140. As described in more detail elsewhere herein, the communication manager 140 may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized; and schedule the first batch of flows and the second batch of flows based at least in part on the respective launch times. Additionally, or alternatively, the communication manager 140 may perform one or more other operations described herein.

In some aspects, a network node 110 may include a communication manager 150. As described in more detail elsewhere herein, the communication manager 150 may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized; and schedule the first batch of flows and the second batch of flows based at least in part on the respective launch times. Additionally, or alternatively, the communication manager 150 may perform one or more other operations described herein.

As indicated above, FIG. 1 is provided as an example. Other examples may differ from what is described with regard to FIG. 1.

Figure 2:
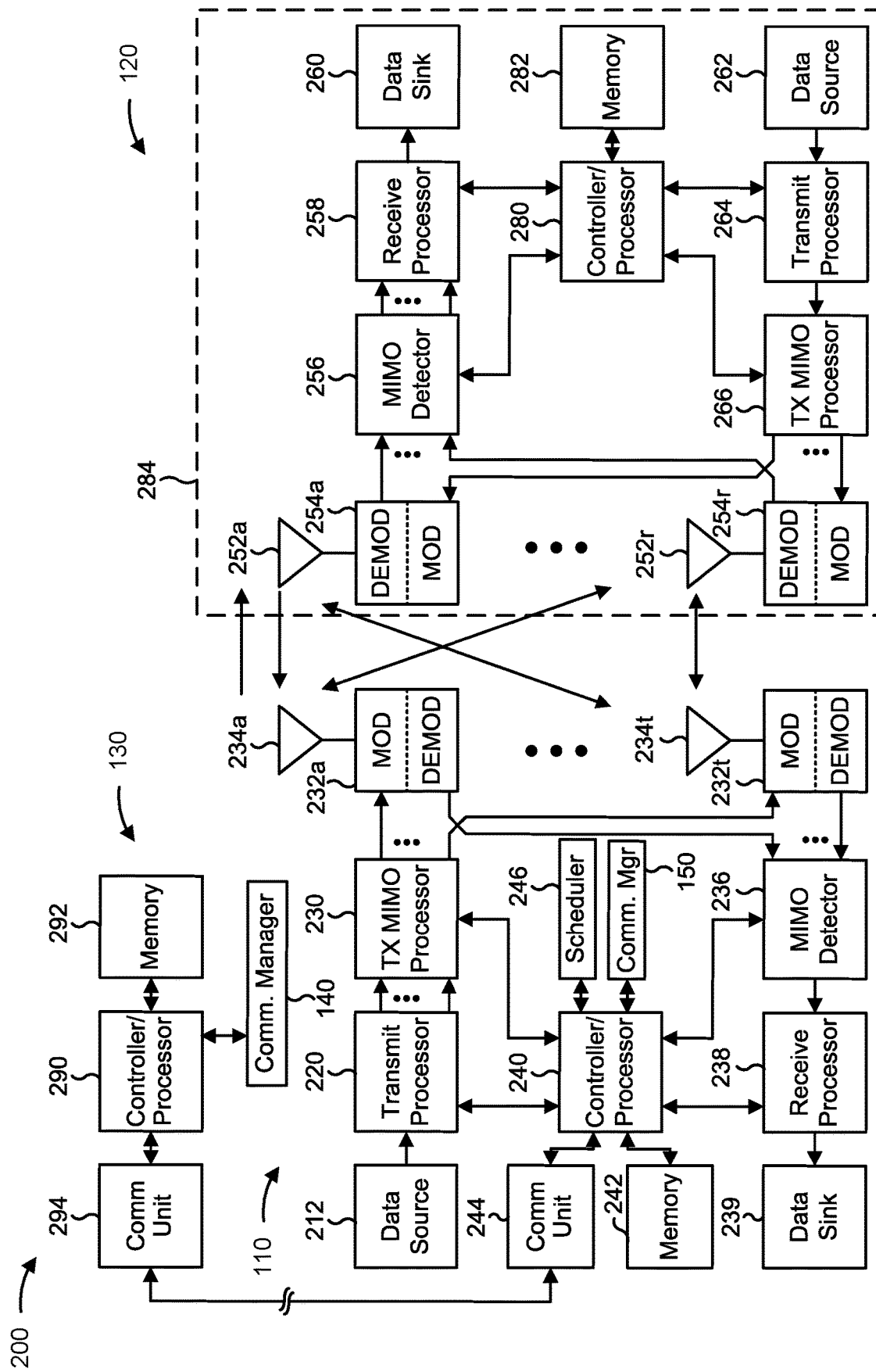
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the network node 110, the controller/processor 280 of the UE 120, the controller/processor 290 of the network controller 130, and/or any other component(s) of FIG. 2 may perform one or more techniques associated with multiple batch scheduling in a network, as described in more detail elsewhere herein. For example, the controller/processor 240 of the network node 110, the controller/processor 280 of the UE 120, the controller/processor 290 of the network controller 130, and/or any other component(s) of FIG. 2 may perform or direct operations of, for example, process 700 of FIG. 7 and/or other processes as described herein. The memory 242, the memory 282, and/or the memory 292 may store data and program codes for the network node 110, the UE 120, and/or the network controller 130, respectively. In some examples, the memory 242, the memory 282, and/or the memory 292 may include a non-transitory computer-readable medium storing one or more instructions (e.g., code and/or program code) for wired and/or wireless communication. For example, the one or more instructions, when executed (e.g., directly, or after compiling, converting, and/or interpreting) by one or more processors of the network node 110, the UE 120, and/or the network controller 130, may cause the one or more processors, the UE 120, the network node 110, and/or the network controller 130 to perform or direct operations of, for example, process 700 of FIG. 7 and/or other processes as described herein. In some examples, executing instructions may include running the instructions, converting the instructions, compiling the instructions, and/or interpreting the instructions, among other examples.

In some aspects, the network node 110 includes means for determining, based at least in part on a data flow model, a respective launch time for each flow of a first batch of flows and for each flow of a second batch of flows, such that an execution time duration for transferring at least one of the first batch of flows and the second batch of flows in a portion of a network is minimized; and/or means for scheduling the first batch of flows and the second batch of flows based at least in part on the respective launch times. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network controller 130 includes means for determining, based at least in part on a data flow model, a respective launch time for each flow of a first batch of flows and for each flow of a second batch of flows, such that an execution time duration for transferring at least one of the first batch of flows and the second batch of flows in a portion of a network is minimized; and/or means for scheduling the first batch of flows and the second batch of flows based at least in part on the respective launch times. The means for the network controller 130 to perform operations described herein may include, for example, one or more of communication manager 140, controller/processor 290, memory 292, or communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
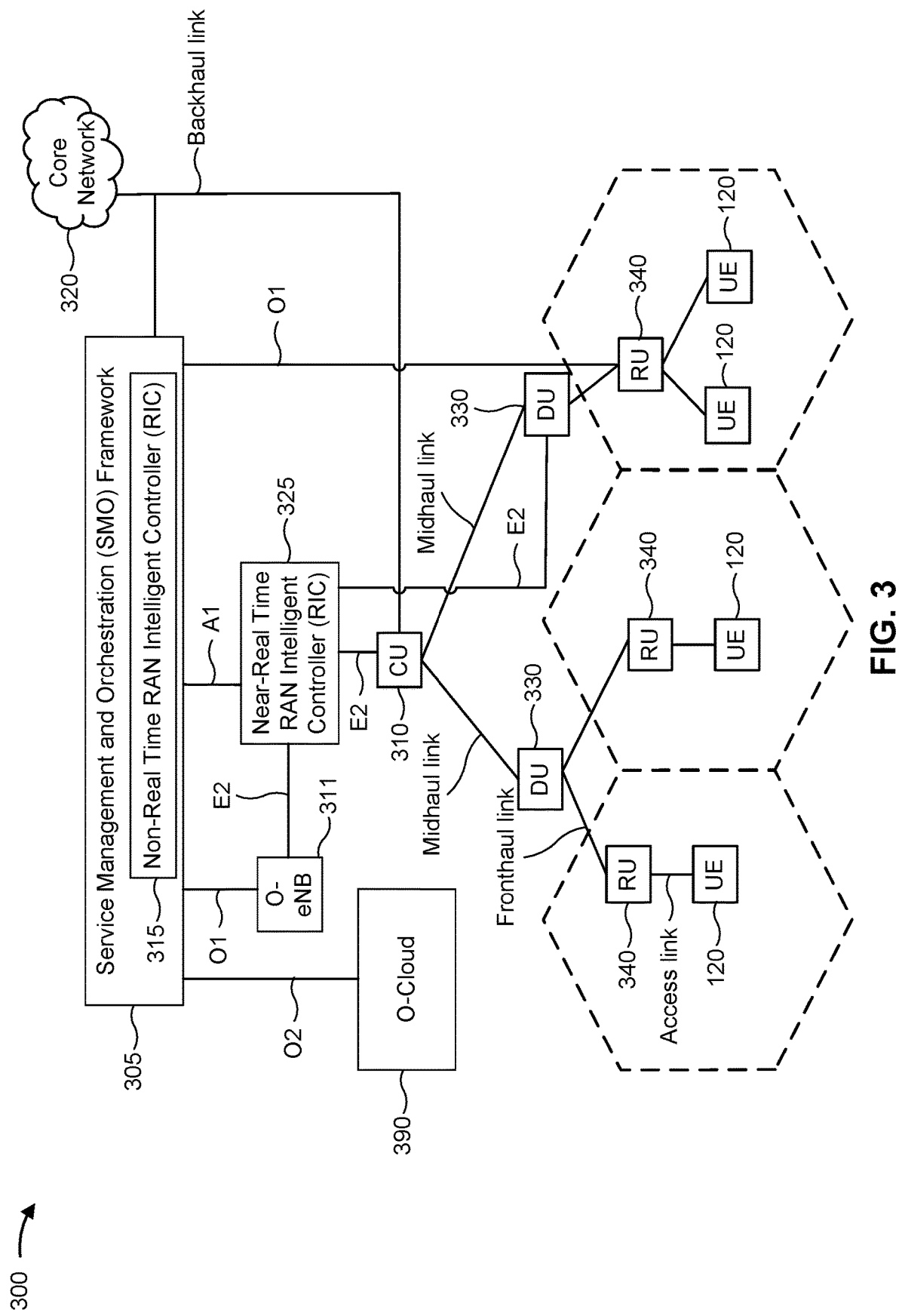
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 (e.g., that includes one or more network controllers 130) via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
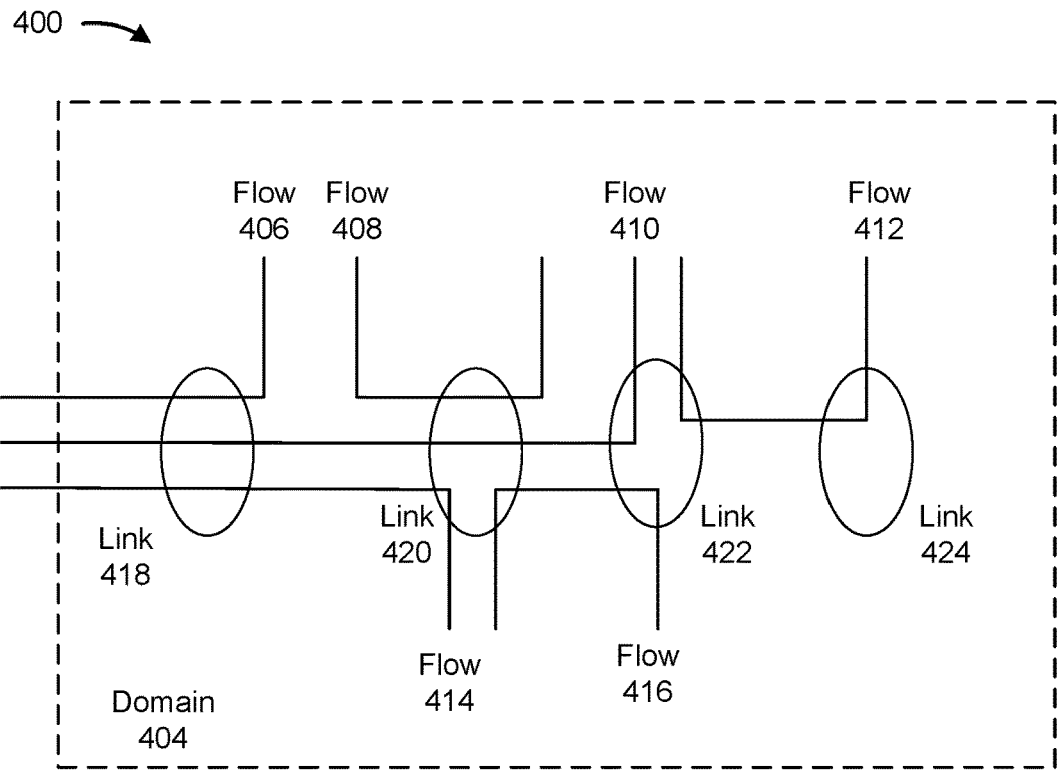
FIG. 4 is a diagram illustrating examples of network modeling, in accordance with the present disclosure.
Figure 4:
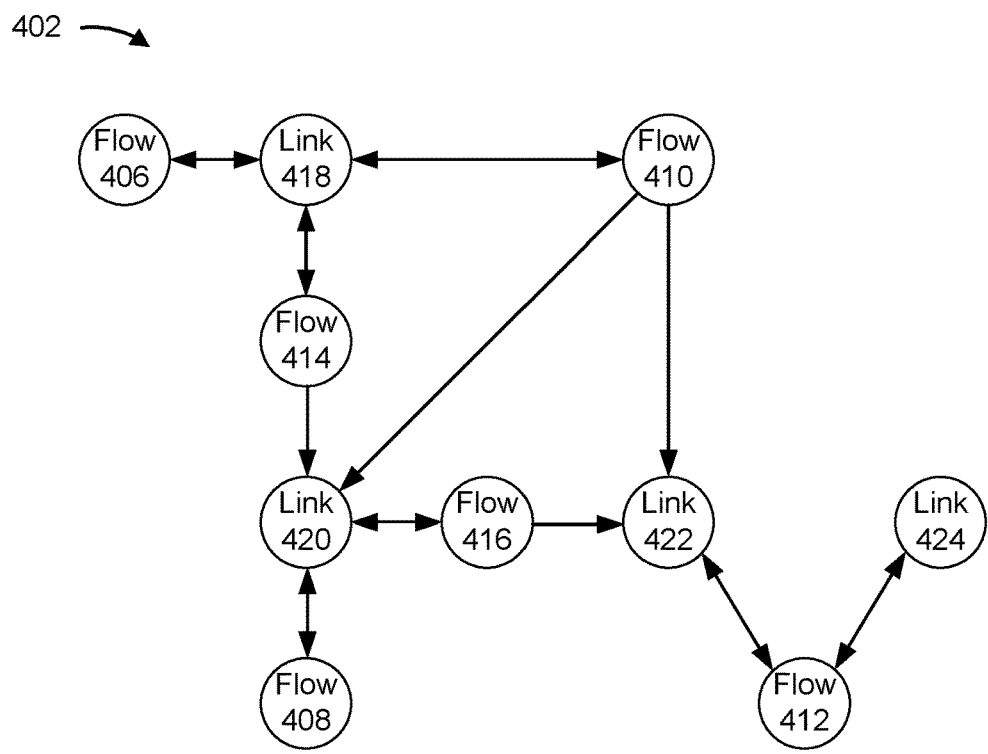

FIG. 4 is a diagram illustrating examples 400 and 402 of network modeling, in accordance with the present disclosure. As shown in FIG. 4, the example 400 includes a domain 404. The domain 404 may be operated by a network entity and/or an operator. The domain 404 may include a computer network, a core network associated with the wireless network 100, a portion of the wireless network 100, and/or another type of network domain.

The domain 404 includes multiple data flows ("flows") and multiple links that connect two or more of the multiple data flows. Some of the data flows may terminate on both ends within the domain, some of the data flows may terminate within the domain 404 at a first end and terminate within another domain, and/or some of the data flows may terminate at both ends outside of the domain 404. The multiple data flows may include one or more connected network entities (e.g., network nodes 110, network controllers 130, and/or another type of network entity) and/or multiple network connections between the one or more network entities. The multiple links may include one or more network entities (e.g., network nodes 110, network controllers 130, and/or another type of network entity) that include an ingress into, and/or egress out from, one or more of the multiple data flows such that data may move from one data flow to another data flow.

The multiple data flows include flow 406 that terminates within the domain 404 at a first end and enters another domain that is not shown. Flow 408 terminates on both ends within the domain 404. Flow 410 terminates within the domain 404 and traverses the domain 404 to terminate in another domain that is not shown. Flow 412 terminates on both ends within the domain 404. Flow 414 terminates within the domain 404 at a first end and enters another domain that is not shown. Flow 416 terminates within the domain 404 at both ends.

The multiple links include link 418 that connects flow 406, flow 410, and flow 414 within the domain 404. Link 420 connects flow 408, flow 410, flow 414, and flow 416 within the domain 404. Link 422 connects flow 410, flow 410, and flow 416 within the domain 404. Link 424 provides a connection to flow 412 that may be used to adjust a configuration of the domain 404.

Each of the multiple links may be associated with a capacity. For example, link 418 may have a capacity of 25 units of data per second (e.g., gigabits per second), link 420 may have a capacity of 50 units of data per second, link 422 may have a capacity of 100 units of data per second, and link 424 may have a capacity of 75 units of data per second. However, other values for the capacities of the links 418-424 are within the scope of the present disclosure.

Each of the multiple data flows may be associated with an actual data flow rate based at least in part on the multiple data flows sharing capacities of the multiple links. For example, link 418 may divide the capacity of 25 units of data per second between communications with flow 406, flow 410, and flow 414. The data flow rate of flow 406 may be 8.3 units of data per second, the data flow rate of flow 408 may be 16.6 units of data per second, the data flow rate of flow 410 may be 8.3 units of data per second, the data flow rate of flow 412 may be 75 units of data per second, the data flow rate of flow 414 may be 8.3 units of data per second, and the data flow rate of flow 416 may be 16.6 units of data per second. Based at least in part on the data flow rates, one or more of the links may be bottleneck links (e.g., a link that reduces the data flow rates that could otherwise be higher if the link had higher capacity). Bottleneck links of a data flow may include a set of link vertices in a data flow structure such that there exists a directed edge from any of these links to the data flow.

Example 402 shows a data flow model that indicates connections that are bottleneck links (indicated with a line having arrows at both ends) and non-bottleneck links (indicated with a line having an arrow at only one end). The data flow model may be referred to as a bottleneck structure or a bottleneck structure graph. To accurately generate the data flow model that includes the flows 406-416 and the links 418-424 in the domain 404, a network entity (e.g., a network node 110, a network controller 130, and/or another type of network entity) may have an oracle view (e.g., having access to the capacities and observed data flow rates of links 418-424 and data flows 406-416 of the domain 404).

The following is an example procedure (e.g., an iterative procedure) to generate a data flow model, such as the example 402 of the data flow model shown in FIG. 4:

```
GradientGraph(N = hL, F, {cl , ∀l ∈ L}i)
  1:    V = ∅; E = ∅; rf = ∞, ∀f ∈ F;
  2:    for l ∈ L do
  3:        al = cl ; # available capacity
  4:        sl = al/|Fl |; # fair share
  5:        MinHeapAdd(key = sl , value= l);
  6:    end for
  7:    while F 6⊆ V do
  8:        l = MinHeapPop( );
  9:        for f ∈ Fl such that rf ≥ sl do
 10:            E = E ∪ {(l, f), (f, l)};
 11:            if f 6∈ V then
 12:                rf = sl ;
 13:                V = V ∪ {f};
 14:                for l 0 ∈ Lf such that rf < sl 0 do
 15:                    E = E ∪ {(f, l0 )}
 16:                    al 0 = al 0 − sl
 17:                    sl 0 = al/|Fl \ V|;
 18:                    MinHeapUpdateKey(value = l 0 , newKey = sl 0 );
 19:                end for
 20:            end if
 21:        end for
 22:        V = V ∪ {l};
 23:    end while
 24:    return hG = hV, Ei, {sl , ∀l ∈ L}, {rf , ∀f ∈ F}i;
``` where N=hL, F, {cl, ∇l∈L} i may be a network in which domain 404 is included, L is a set of links of the form {l1, l2, . . . , l|L|}, •F is a set of flows of the form {f1, f2, . . . , f|F|}, and •cl is the capacity of link 1, for all l∈L. The gradient of a link 1 ∈L with respect to another link 1*∈L may be $\nabla l^*(l) = \partial sl/\partial cl^*$, the gradient of a flow f∈F with respect to some link 1*∈L may be $\nabla l^*(f) = \partial rf/\partial cl^*$, the gradient of a link 1 ∈L with respect to a flow f*∈F may be $\nabla f^*(l) = \partial sl/\partial rf$, and gradient of a flow f∈F with respect to another flow f*∈F may be $\nabla f^*(f) = \partial rf/\partial rf^*$.

As indicated above, FIG. 4 is provided as an example. Other examples may differ from what is described with regard to FIG. 4.

Figure 5A:
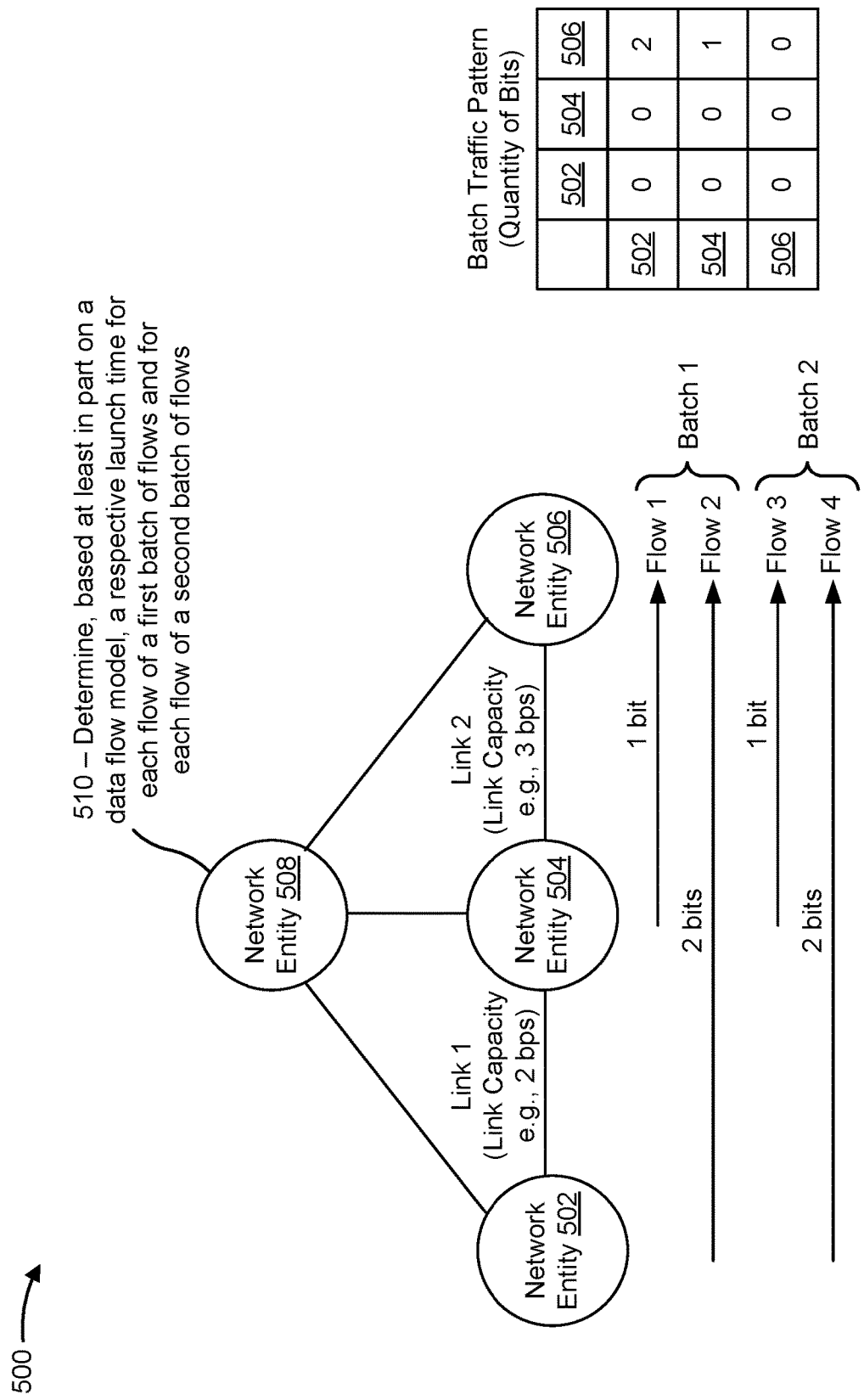
Figure 5C:
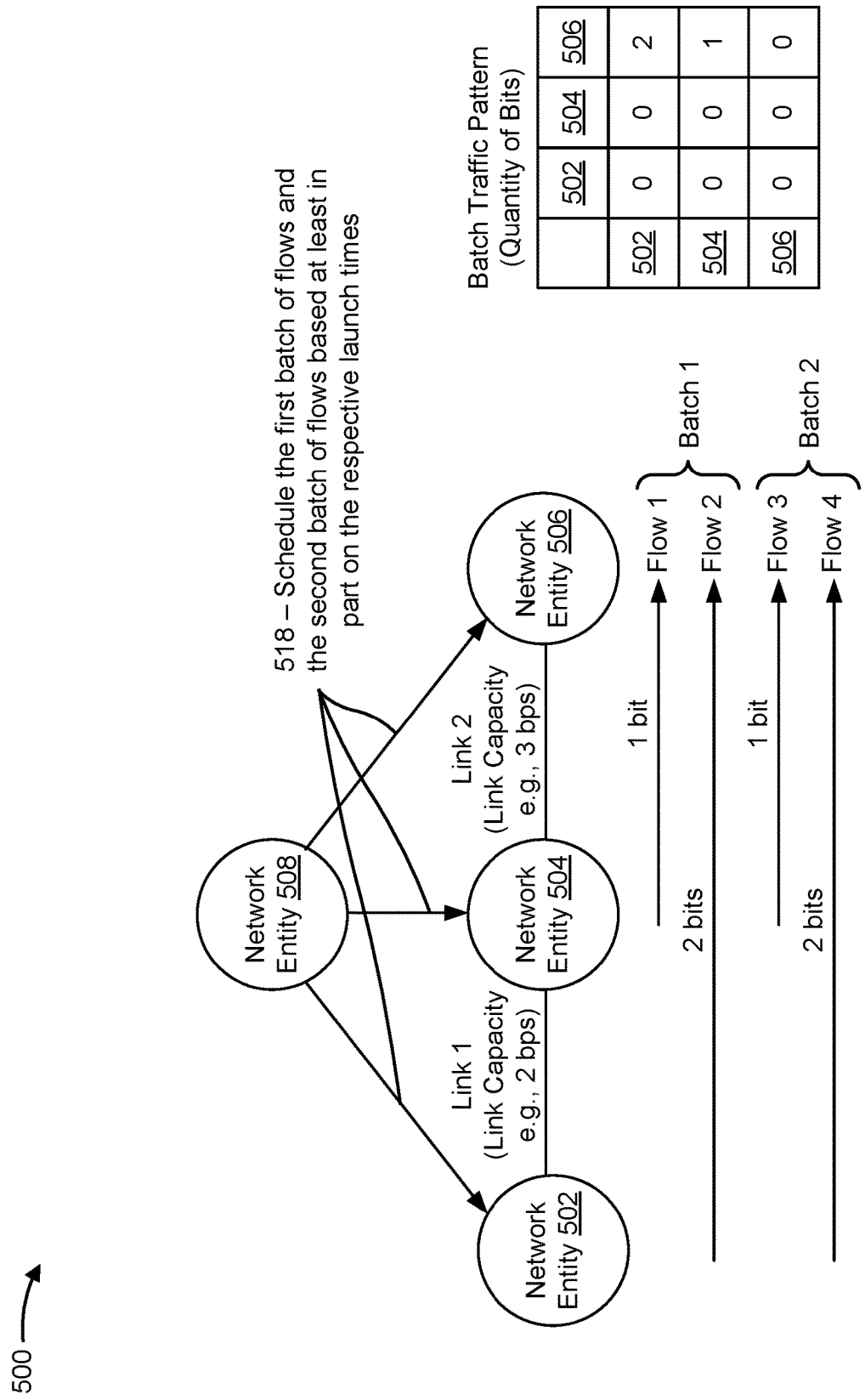

FIGS. 5A-5C are diagrams of an example 500 of multiple batch scheduling in a network, in accordance with the present disclosure. In particular, the example 500 may include an example of multiple batch scheduling using a data flow model generated for a portion of the network, as described above in connection with FIG. 4.

As shown in FIG. 5A, the example 500 may include a plurality of network entities 502-508. Each of the network entities may include and/or may be implemented by a network node 110, a network controller 130, a CU 310, a DU 330, and/or an RU 340, among other examples. The network entities 502-508 may be included in a portion of the network (e.g., a domain 404). The network may include a wireless network 100, a core network (e.g., core network 320) associated with the wireless network 100, and/or another type of network. One or more of the network entities may be included in a data center, a local area network, a wide area network, a public network such as the Internet, a microprocessor network (e.g., a network on chip), and/or another type of electronic and/or optical communication network. The network may include a wireless network and/or a wired network.

The network entity 502 and the network entity 504 may be communicatively connected by a first link (Link 1 in FIG. 5A, which may correspond to a link 418-424 and/or another link). The network entity 504 and the network entity 506 may be communicatively connected by a second link (Link 2 in FIG. 5A, which may correspond to a link 418-424 and/or another link). In some aspects, Link 1 and Link 2 may have approximately the same capacity. In some aspects, Link 1 and Link 2 may have different capacities. For example, Link 1 may have a capacity of approximately 2 bits per second (e.g., 2 bps), and Link 2 may have a capacity of approximately 3 bits per second (e.g., 3 bps). However, other values are within the scope of the present disclosure.

The network entity 508 may be communicatively connected with the network entities 502-506 and may perform scheduling of batches of flows (e.g., flows 406-412 and/or another flow) through and/or between the network entities 502-506. As shown in the example 500 in FIG. 5A, the network entity 508 may schedule a batch of flows corresponding to Batch 1 that includes Flow 1 and Flow 2. Flow 1 may include a 1-bit flow between the network entity 504 and the network entity 506 on Link 2. Flow 2 may include a 2-bit flow between the network entity 502 and the network entity 506 on Links 1 and 2.

The network entity 508 may schedule another batch of flows corresponding to Batch 2 that includes Flow 3 and Flow 4. Flow 3 may include a 1-bit flow between the network entity 504 and the network entity 506 on Link 2. Flow 4 may include a 2-bit flow between the network entity 502 and the network entity 506 on Links 1 and 2.

FIG. 5A illustrates a batch traffic pattern for Batch 1 and Batch 2. As shown in the batch traffic pattern, the quantity of bits transferred between network entity 502 and network entity 506 for each of Flow 2 and Flow 4 is 2 bits. As further shown in the batch traffic pattern, the quantity of bits transferred between network entity 504 and network entity 506 for each of Flow 1 and Flow 3 is 1 bit.

As further shown in FIG. 5A, at 510, the network entity 508 may determine, based at least in part on a data flow model, a respective launch time for each flow of the first batch of flows (Batch 1 that includes Flow 1 and Flow 2) and for each flow of a second batch of flows (Batch 2 that includes Flow 3 and Flow 4). The network entity 508 may generate the data flow model (e.g., a bottleneck structure or bottleneck structure graph) using techniques described above in connection with FIG. 4. The network entity 508 may use the data flow model to schedule the respective launch times for the flows of Batch 1 and Batch 2 such that an execution time duration for transferring the flows of Batch 1 and/or Batch 2 between the network entities 502-506 is minimized.

FIG. 5B illustrates various techniques for using the data flow model to schedule the respective launch time for the flows of Batch 1 and Batch 2 such that an execution time duration for transferring the flows of Batch 1 and/or Batch 2 between the network entities 502-506 is minimized.

Reference number 512 illustrates an example in which Batch 1 and Batch 2 are both launched at the same time T0. Here, the transfer of Flow 1, Flow 2, Flow 3, and Flow 4 are all simultaneously initiated at time T0. Flow 1 and Flow 3 are transferred from the network entity 504 to the network entity 506 via Link 2. Flow 2 and Flow 4 are transferred from the network entity 502 to the network entity 506 through the network entity 504 via Link 1 and Link 2. At time T1 (e.g., a time after time T0), Flow 1 of Batch 1 and Flow 3 of Batch 2 complete transferring to the network entity 506. From time T1 to time T2 (e.g., a time after time T1), Flow 2 of Batch 1 and Flow 4 of Batch 2 continue to transfer to network entity 506 and complete at time T2.

Using the example capacities for Link 1 and Link 2 described above in connection with FIG. 5A, time T1 may be approximately 1.33 seconds. In other words, the execution time duration for transferring Flow 1 of Batch 1 and Flow 3 of Batch 2 from the network entity 504 to the network entity 506 may be approximately 1.33 seconds. The transfer rate of Flows 1-4 between time T0 and time T1 may be approximately 0.75 bits per second.

Time T2 may be approximately 2.33 seconds. In other words, the total execution time duration for transferring Flows 1-4 of Batches 1 and 2 may be approximately 2.33 seconds based at least in part on launching Flows 1-4 simultaneously at time T0. The transfer rate of Flow 2 and Flow 4 between time T1 and time T2 may be approximately 1 bit per second.

Reference number 514 illustrates an example in which the network entity 508 uses the data flow model for the portion of the network that includes the network entities 502-506 to determine when to launch Batch 2 after Batch 1 is launched. In this example, the network entity 508 schedules the launching of Batch 1 and Batch 2 as atomic batches, meaning that Flow 1 and Flow 2 of Batch 1 are launched simultaneously and are not separated, and Flow 3 and Flow 4 of Batch 2 are launched simultaneously and are not separated.

As indicated above, the data flow model (e.g., a bottleneck structure and/or a flow gradient graph) may include a computational graph that characterizes a state of the portion of the network, which may enable the network entity 508 to compute network derivatives for determining the optimal time at which to launch Batch 2 after Batch 1 is launched. The "optimal time" for launching Batch 2 may refer to the launch time that minimizes the execution time duration (e.g., the total execution time duration) for transferring the Flows 1-4 of the Batches 1 and 2.

The network entity 508 may generate data flow models for the portion of the network that includes the network entities 502-506 using candidate launch times for Batch 2 as a perturbation in the portion of the network. The perturbation causes the data flow model to change over time because of the flows being transferred on each of the links Link 1 and Link 2. Thus, the network entity 508 may iterate data flow models and associated network derivates over a plurality of candidate launch times for Batch 2.

To reduce the computational load on the network entity 508 for determining the optimal launch time for Batch 2, the network entity 508 may model the total execution time duration for Flows 1-4 of Batches 1 and 2 as a piecewise linear function, which reduces the quantity of iterations over candidate launch times needed for determining the optimal launch time. The piecewise linear function for the execution time duration of a flow may be modeled as:

$$fct(f,b,t)$$

where fct corresponds to the completion time of flow f, where f is a flow in a batch b, and batch b is launched at time t. The network entity 508 may model b_0 and b_1 as two instances of batch b, where b_0 is launched at time T0 and b_1 is launched at time t, where t>0. The network entity 508 may determine, using the above piecewise linear function, a value for time t that minimizes {max {fct(f,b,t), for all flows f in batch b, and all batches b in {b1, b2}}}, where b1 corresponds to Batch 1 and b2 corresponds to Batch 2.

The above-described piecewise linear function technique can be implemented as the following algorithm:

1. set t_i = 0, where i = 0
2. T = [ ]
3. t* = t_i
4. add t_i to T
5. maxfct = infinity
6. while maxfct > t_i:
   6.1. Compute the derivative of fct(f, b_1, t) with respect to t at time t_i for all flows in batch b_1
   6.2. Use these derivatives to compute the value of t_{i+1}, corresponding to the next smallest time at which any two flows in b_0 andb_1 collide
   6.3. i = i + 1
   6.4. if max{fct(f, b_1, t_i)} < maxfct:
     6.4.1. maxfct = max{fct(f, b_1, t_i)}
     6.4.2 t* = t_i
   6.5 Add t_i to T.

In this way, the network entity 508 schedules Flows 1-4 of Batches 1 and 2 in a manner in which the launch time of Flows 3 and 4 of Batch 2 (e.g., the starting time for initiating transfer of Flows 3 and 4 of Batch 2) is staggered, delayed, and/or offset in the time domain relative to the launch time of Flows 1 and 2 of Batch 1 (e.g., the starting time for initiating transfer of Flows 1 and 2 of Batch 1). This enables the capacities of Links 1 and 2 to be initially allocated for transferring Flows 1 and 2, which enables the transfer of Flow 1 to complete more quickly.

The network entity 508 may schedule the launch time of Flows 1 and 2 of Batch 1 to occur at time T0. The network entity 508 may schedule the launch time of Flows 3 and 4 of Batch 2 to be the time T1 (e.g., a time after time T0) at which the transfer of Flow 1 completes, because the capacities of Link 2 is no longer needed for Flow 1 and can be now allocated to transferring Flows 3 and 4. Flows 2 and 3 complete at time T2, and Flow 4 (and the overall transfer of Batches 1 and 2) completes at time T3.

This enables the transfer of Flows 2-4 (and the overall completion time of transferring Batch 1 and 2) to be a lesser time duration relative to the example illustrated by reference number 512. In other words, time T3 in the example associated with reference number 514 may occur earlier in time relative to the time T2 in the example associated with reference number 512. For example, time T3 in the example associated with reference number 514 may occur after approximately 2.166 seconds from time T0 in the example associated with reference number 514, whereas time T2 in the example associated with reference number 512 may occur after approximately 2.33 seconds from time T0 in the example associated with reference number 512.

Reference number 516 illustrates another example in which the network entity 508 uses the data flow model for the portion of the network that includes the network entities 502-506 to determine when to launch Flows 1-4 of Batch 1 and Batch 2. The network entity 508 may use similar techniques and/or algorithms as described above in connection with reference number 514. However, in the example associated with reference number 516, the network entity 508 schedules the launching of Batch 1 and Batch 2 as non-atomic batches. In other words, the network entity 508 is permitted to perform flow-level scheduling using similar techniques and/or algorithms as described above in connection with reference number 514. Here, the network entity 508 may schedule Flow 1 and Flow 2 of Batch 1 to have different launch times, and/or may schedule Flow 3 and Flow 4 of Batch 2 to have different launch times.

The network entity 508 may schedule the launch time of Flows 1 and 2 of Batch 1, and Flow 3 of Batch 2, to occur at time T0. The network entity 508 may schedule the launch time of Flow 4 of Batch 2 to be the time T1 (e.g., a time after time T0) at which the transfer of Flow 1 completes, because the capacities of Link 2 is no longer needed for Flow 1 and can be now allocated to transferring Flow 3. Flows 2, 3, and 4 (and the overall transfer of Batches 1 and 2) complete at time T2.

This enables the overall completion time of transferring Batch 1 and 2 to be a lesser time duration relative to the example illustrated by reference number 512. In other words, time T2 in the example associated with reference number 516 may occur earlier in time relative to the time T2 in the example associated with reference number 512. For example, time T2 in the example associated with reference number 516 may occur after approximately 2 seconds from time T0 in the example associated with reference number 516, whereas time T2 in the example associated with reference number 512 may occur after approximately 2.33 seconds from time T0 in the example associated with reference number 512.

As shown in FIG. 5C, at 518, the network entity 508 may schedule the first batch of flows (e.g., Flow 1 and Flow 2 of Batch 1) and the second batch of flows (e.g., Flow 3 and Flow 4 of Batch 2) based at least in part on the respective launch times determined using one or more of the techniques described above. The network entity 508 may transmit one or more communications to one or more of the network entity 502, the network entity 504, and/or the network entity 506 to schedule the first batch of flows and the second batch of flows based at least in part on the respective launch times.

As indicated above, FIGS. 5A-5C are provided as an example. Other examples may differ from what is described with regard to FIGS. 5A-5C.

Figure 6A:
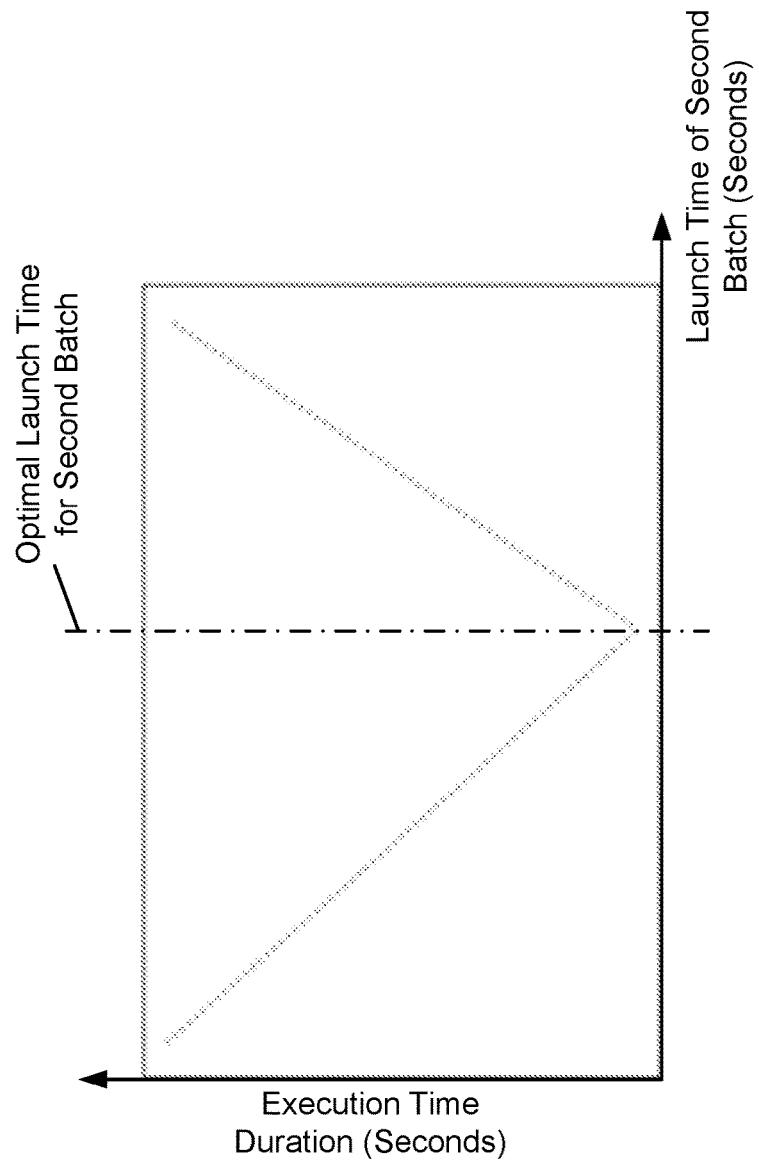
FIGS. 6A and 6B are diagrams of examples of multiple batch scheduling in a network, in accordance with the present disclosure.
Figure 6B:
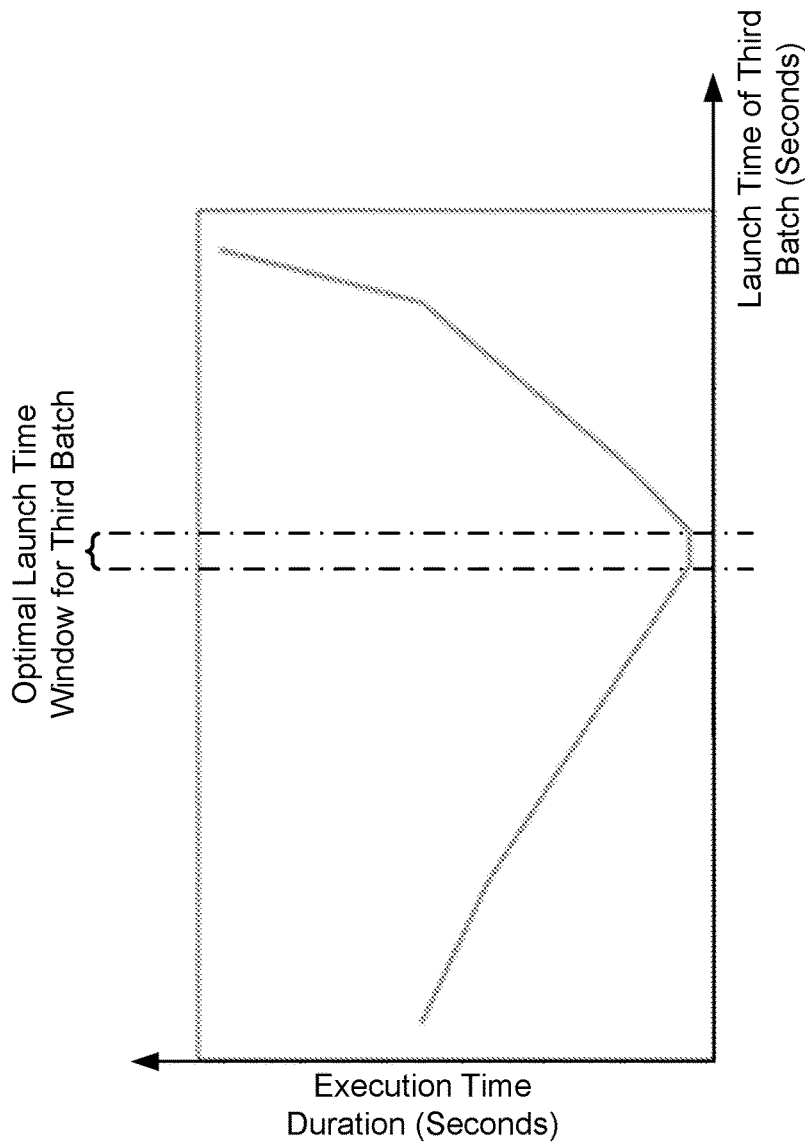

FIGS. 6A and 6B are diagrams of examples of multiple batch scheduling in a network, in accordance with the present disclosure.

FIG. 6A is a diagram of an example 600 in which the network entity 508 schedules the transfer of flows for two batches. The network entity 508 may schedule the launch time of the flows of a first batch to occur first in time, and may schedule the launch time of the flows of a second batch to occur after the launch time of the flows of the first batch. The network entity 508 may determine the optimal launch time for the second batch based at least in part on modeling perturbations (e.g., candidate launch times) in a data flow model for a portion of a network through which the batches are to be transferred. The network entity 508 may use a piecewise linear function to identify slopes or gradients for the execution time duration of the two batches as a function of launch time of the second batch to identify a discontinuity (e.g., a launch time that corresponds to a transition between the slopes or gradients), which may correspond to the optimal launch time for the second batch. At each discontinuity (which corresponds to a collision point between a completion time of a flow and a start time of another flow), the network entity 508 may determine the gradient. The gradient (e.g., the slope of the piecewise linear function) enables the network entity 508 to determine how far to progress through the piecewise linear segment of the piecewise linear function until the next discontinuity is encountered. This enables the network entity 508 to reduce the computational load (and the consumption of memory and processing resources of the network entity 508) to only computing the candidate launch times for the second batch for just a finite number of (discontinuity) points, corresponding to the collisions.

FIG. 6B is a diagram of an example 602 in which the network entity 508 schedules the transfer of flows for three batches. The network entity 508 may schedule the launch time of the flows of a first batch and a second batch to occur first in time, and may schedule the launch time of the flows of a third batch to occur after the launch time of the flows of the first batch and the second batch. The network entity 508 may determine the optimal launch time for the third batch based at least in part on modeling perturbations (e.g., candidate launch times) in a data flow model for a portion of a network through which the batches are to be transferred. The network entity 508 may use a piecewise linear function to identify slopes or gradients for the execution time duration of the three batches as a function of launch time of the third batch to identify a discontinuity (e.g., a launch time that corresponds to a transition between the slopes or gradients), which may correspond to the optimal launch time for the third batch.

As further shown in FIG. 6B, the network entity 508 may determine an optimal launch time window for the third batch. The network entity 508 may select a launch time that is within the launch time window to minimize the execution time duration for the three batches.

As indicated above, FIGS. 6A and 6B are provided as examples. Other examples may differ from what is described with regard to FIGS. 6A and 6B. The techniques described above in connection with FIGS. 4, 5A-5C, 6A, and/or 6B may be expanded to greater than three batches of flows that are to be transferred through a portion of a network.

Figure 7:
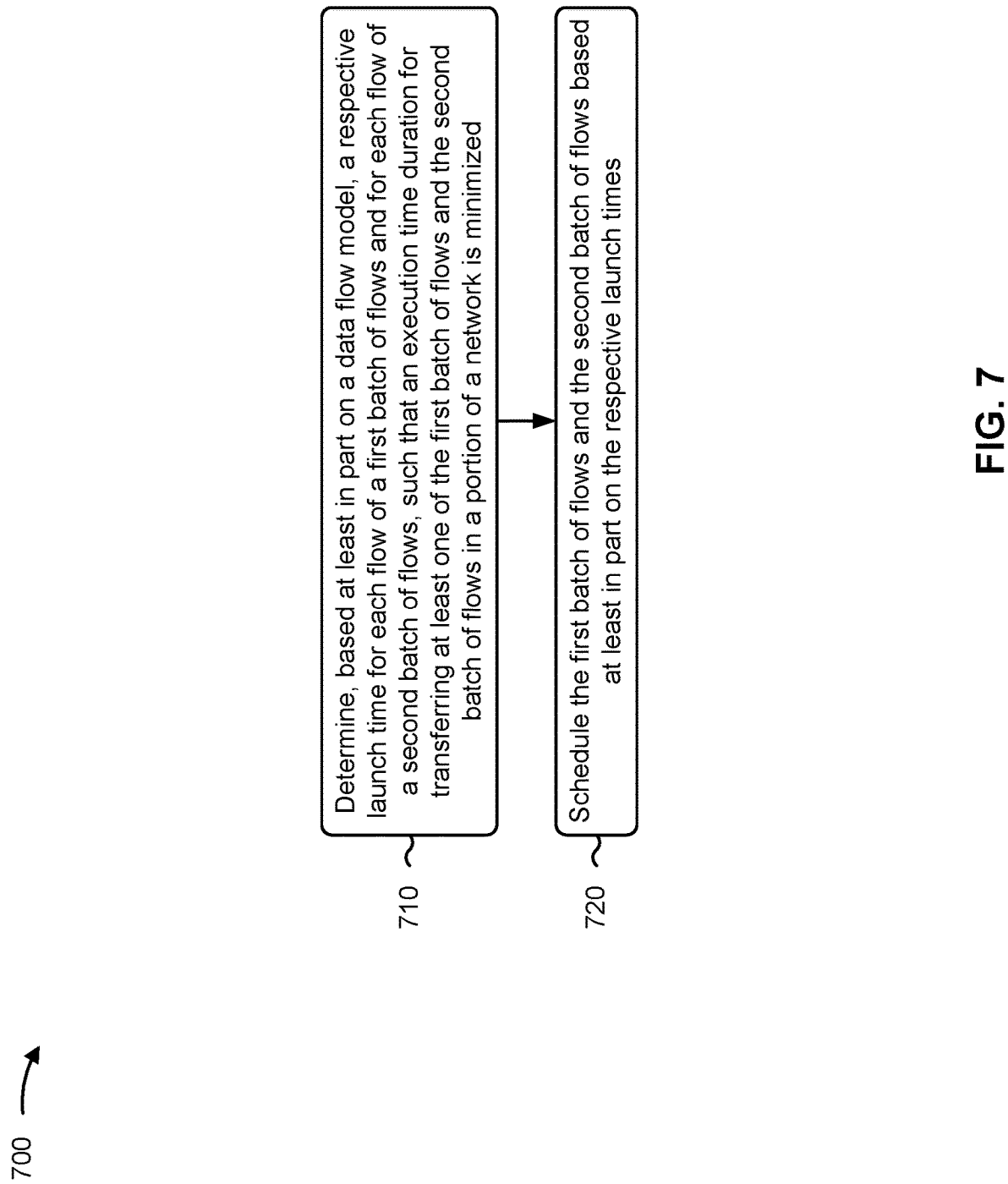
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., a network node 110, a network controller 130, a CU 310, a DU 330, an RU 340, a network entity 502-508) performs operations associated with multiple batch scheduling in a network.

As shown in FIG. 7, in some aspects, process 700 may include determining, based at least in part on a data flow model, a respective launch time for each flow of a first batch of flows and for each flow of a second batch of flows, such that an execution time duration for transferring at least one of the first batch of flows and the second batch of flows in a portion of a network is minimized (block 710). For example, the network entity (e.g., using communication manager 140, communication manager 150, communication manager 806 depicted in FIG. 8, communication manager 906 depicted in FIG. 9) may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized, as described above.

As further shown in FIG. 7, in some aspects, process 700 may include scheduling the first batch of flows and the second batch of flows based at least in part on the respective launch times (block 720). For example, the network entity (e.g., communication manager 140, communication manager 150, communication manager 806 depicted in FIG. 8, communication manager 906 depicted in FIG. 9) may schedule the first batch of flows and the second batch of flows based at least in part on the respective launch times, as described above.

Process 700 may include additional aspects, such as any single aspect or any combination of aspects described below and/or in connection with one or more other processes described elsewhere herein.

In a first aspect, the data flow model comprises a bottleneck structure model of the portion of the network.

In a second aspect, alone or in combination with the first aspect, determining the respective launch times comprises determining a first launch time for a first flow of the first batch of flows, and determining a first launch time for a first flow of the second batch of flows, wherein the first launch time for the first flow of the second batch of flows occurs at a same time, or after, the first launch time for the first flow of the first batch of flows.

In a third aspect, alone or in combination with one or more of the first and second aspects, determining the first launch time for the first flow of the second batch of flows comprises determining the first launch time for the first flow of the second batch of flows to be a time at which the first flow of the first batch completes.

In a fourth aspect, alone or in combination with one or more of the first through third aspects, determining the respective launch times comprises determining that a first launch time for each flow in the first batch of flows is a same first launch time, and determining that a second launch time for each flow in the second batch of flows is a second launch time, wherein the second launch time occurs after the same first launch time.

In a fifth aspect, alone or in combination with one or more of the first through fourth aspects, determining the respective launch times comprises determining that a first launch time for each flow in the first batch of flows and for a first flow of the second batch of flows is a same first launch time, and determining a second launch time for a second flow in the second batch of flows, wherein the second launch time occurs after the same first launch time.

In a sixth aspect, alone or in combination with one or more of the first through fifth aspects, determining the respective launch times comprises determining a shortest execution time duration for each flow of the first batch of flows and for each flow of the second batch of flows by modeling candidate launch times, for the second batch of flows, in a piecewise linear function associated with the data flow model.

In a seventh aspect, alone or in combination with one or more of the first through sixth aspects, determining the respective launch times comprises determining, using a piecewise linear function, a gradient corresponding to a slope of the piecewise linear function of candidate launch times, and determining, based at least in part on the gradient, a discontinuity of the piecewise linear function corresponding to the respective launch times.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
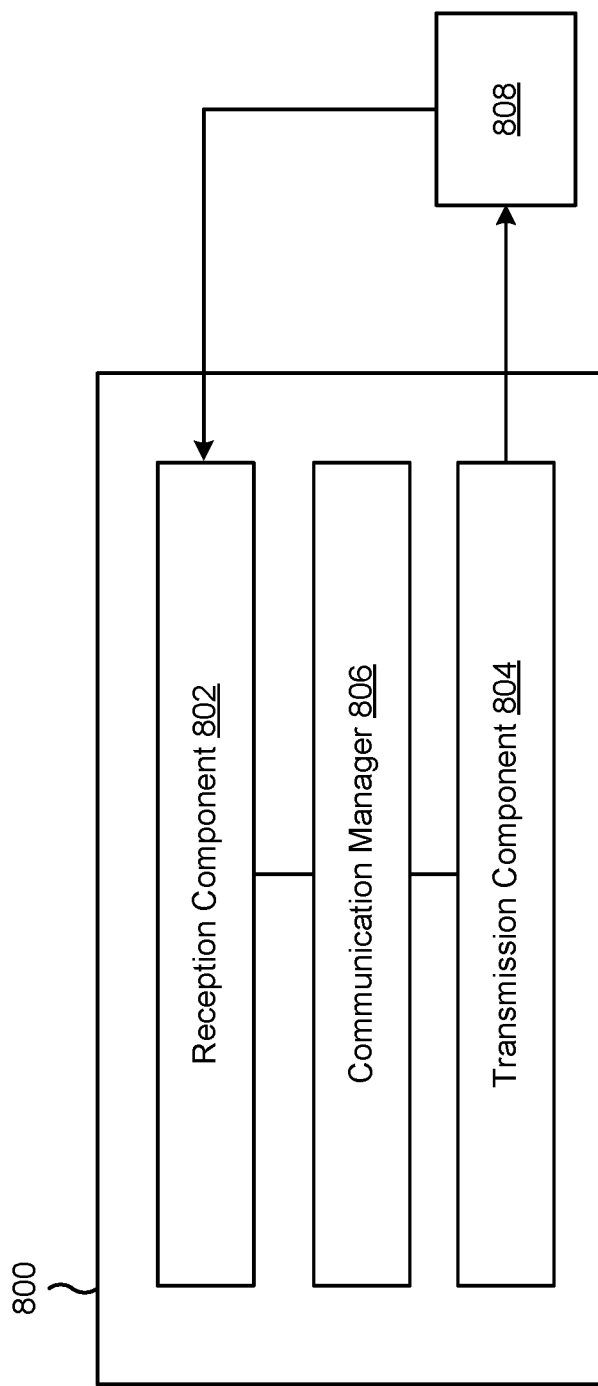
FIG. 8 is a diagram of an example apparatus for wired and/or wireless communication, in accordance with the present disclosure.

FIG. 8 is a diagram of an example apparatus 800 for wired and/or wireless communication, in accordance with the present disclosure. The apparatus 800 may be a network controller (e.g., a network controller 130, a network entity 502-508), or a network controller may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a network entity (e.g., a network node 110, a network controller 130, a CU 310, a DU 330, an RU 340, a network entity 502-508), using the reception component 802 and the transmission component 804.

In some aspects, the apparatus 800 may be configured to perform one or more operations described herein in connection with FIGS. 4-6B. Additionally, or alternatively, the apparatus 800 may be configured to perform one or more processes described herein, such as process 700 of FIG. 7. In some aspects, the apparatus 800 and/or one or more components shown in FIG. 8 may include one or more components of the network controller 130 described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more communication managers 140, one or more controller/processors 290, one or more memories 292, one or more communication units 294, or a combination thereof, of the network controller 130 described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 804 may include one or more communication managers 140, one or more controller/processors 290, one or more memories 292, one or more communication units 294, of the network controller described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

In some aspects, the communication manager 806 may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized. In some aspects, the reception component 802, the transmission component 804, and/or the communication manager 806 may schedule the first batch of flows and the second batch of flows based at least in part on the respective launch times.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
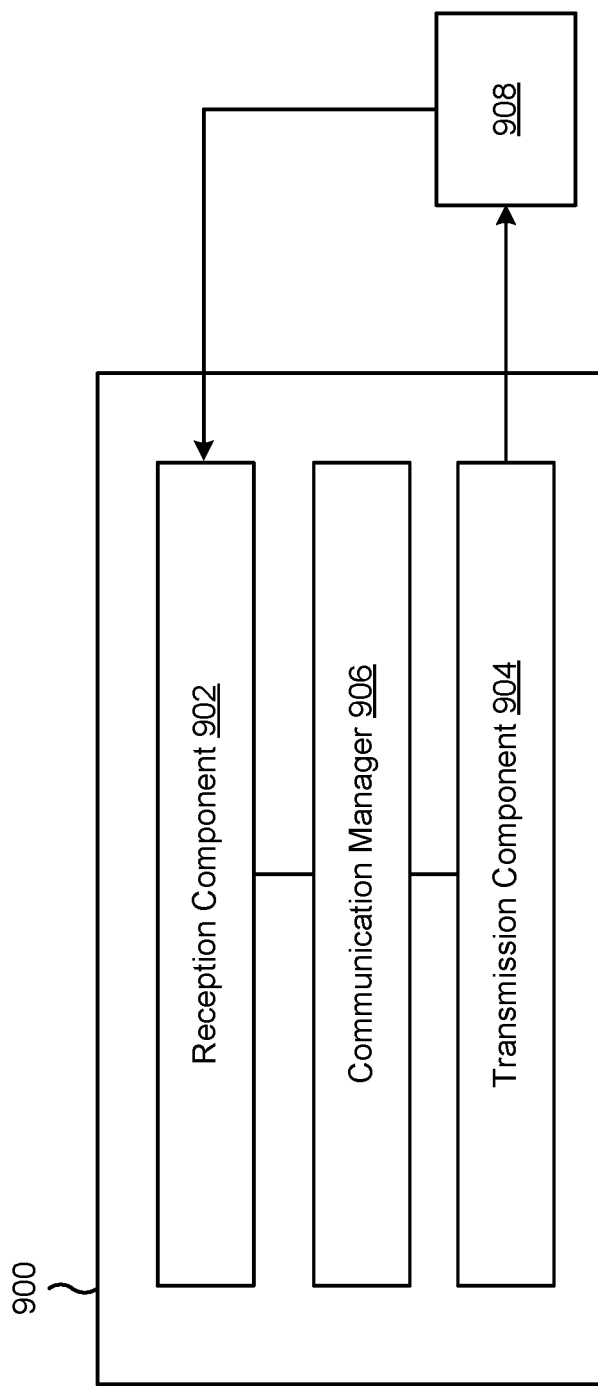
FIG. 9 is a diagram of an example apparatus for wired and/or wireless communication, in accordance with the present disclosure.

FIG. 9 is a diagram of an example apparatus 900 for wired and/or wireless communication, in accordance with the present disclosure. The apparatus 900 may be a network node (e.g., a network node 110, a CU 310, a DU 330, an RU 340, a network entity 502-508), or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a network entity (e.g., a network node 110, a network controller 130, a CU 310, a DU 330, an RU 340, a network entity 502-508), using the reception component 902 and the transmission component 904.

In some aspects, the apparatus 900 may be configured to perform one or more operations described herein in connection with FIGS. 4-6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

In some aspects, the communication manager 906 may determine, based at least in part on a data flow model, a respective launch time for each flow of a first batch of flows and for each flow of a second batch of flows, such that an execution time duration for transferring at least one of the first batch of flows and the second batch of flows in a portion of a network is minimized. In some aspects, the reception component 902, the transmission component 904, and/or the communication manager 906 may schedule the first batch of flows and the second batch of flows based at least in part on the respective launch times.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of communication performed by a network entity, comprising: determining, based at least in part on a data flow model, a respective launch time for each flow of a first batch of flows and for each flow of a second batch of flows, such that an execution time duration for transferring at least one of the first batch of flows and the second batch of flows in a portion of a network is minimized; and scheduling the first batch of flows and the second batch of flows based at least in part on the respective launch times.

Aspect 2: The method of Aspect 1, wherein the data flow model comprises a bottleneck structure model of the portion of the network.

Aspect 3: The method of any of Aspects 1-2, wherein determining the respective launch times comprises: determining a first launch time for a first flow of the first batch of flows; and determining a first launch time for a first flow of the second batch of flows, wherein the first launch time for the first flow of the second batch of flows occurs at a same time, or after, the first launch time for the first flow of the first batch of flows.

Aspect 4: The method of Aspect 3, wherein determining the first launch time for the first flow of the second batch of flows comprises: determining the first launch time for the first flow of the second batch of flows to be a time at which the first flow of the first batch completes.

Aspect 5: The method of any of Aspects 1-4, wherein determining the respective launch times comprises: determining that a first launch time for each flow in the first batch of flows is a same first launch time; and determining that a second launch time for each flow in the second batch of flows is a second launch time, wherein the second launch time occurs after the same first launch time.

Aspect 6: The method of any of Aspects 1-5, wherein determining the respective launch times comprises: determining that a first launch time for each flow in the first batch of flows and for a first flow of the second batch of flows is a first launch time; and determining a second launch time for a second flow in the second batch of flows, wherein the second launch time occurs after the first launch time.

Aspect 7: The method of any of Aspects 1-6, wherein determining the respective launch times comprises: determining a shortest execution time duration for each flow of the first batch of flows and for each flow of the second batch of flows by modeling candidate launch times, for the second batch of flows, in a piecewise linear function associated with the data flow model.

Aspect 8: The method of any of Aspects 1-7, wherein determining the respective launch times comprises: determining, using a piecewise linear function, a gradient corresponding to a slope of the piecewise linear function of candidate launch times; and determining, based at least in part on the gradient, a discontinuity of the piecewise linear function corresponding to the respective launch times.

Aspect 9: An apparatus for wired and/or wireless communication at a device, comprising a processor; memory coupled with the processor; and instructions stored in the memory and executable by the processor to cause the apparatus to perform the method of one or more of Aspects 1-8.

Aspect 10: A device for wired and/or wireless communication, comprising one or more memories and one or more processors coupled to the one or more memories, the one or more processors configured to perform the method of one or more of Aspects 1-8.

Aspect 11: An apparatus for wired and/or wireless communication, comprising at least one means for performing the method of one or more of Aspects 1-8.

Aspect 12: A non-transitory computer-readable medium storing code for wired and/or wireless communication, the code comprising instructions executable by a processor to perform the method of one or more of Aspects 1-8.

Aspect 13: A non-transitory computer-readable medium storing a set of instructions for wired and/or wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network entity for communication, comprising:
one or more memories; and
one or more processors, coupled to the one or more memories, configured to:
determine, based at least in part on a data flow model, a respective launch time for each flow of a first batch of flows and for each flow of a second batch of flows, such that an execution time duration for transferring at least one of the first batch of flows or the second batch of flows in a portion of a network is minimized; and
schedule the first batch of flows and the second batch of flows based at least in part on the respective launch times;
wherein the one or more processors, to determine the respective launch times, are configured to:
determine, using a piecewise linear function, a gradient corresponding to a slope of the piecewise linear function of candidate launch times; and
determine, based at least in part on the gradient, a discontinuity of the piecewise linear function corresponding to the respective launch times.

2. The network entity of claim 1, wherein the data flow model comprises a bottleneck structure model of the portion of the network.

3. The network entity of claim 1, wherein the one or more processors, to determine the respective launch times, are configured to:
determine a first launch time for a first flow of the first batch of flows; and
determine a first launch time for a first flow of the second batch of flows,
wherein the first launch time for the first flow of the second batch of flows occurs at a same time as, or after, the first launch time for the first flow of the first batch of flows.

4. The network entity of claim 3, wherein the one or more processors, to determine the first launch time for the first flow of the second batch of flows, are configured to: determine the first launch time for the first flow of the second batch of flows to be a time at which the first flow of the first batch completes.

5. The network entity of claim 1, wherein the one or more processors, to determine the respective launch times, are configured to:
determine that a first launch time for each flow in the first batch of flows is a same first launch time; and
determine that a second launch time for each flow in the second batch of flows is a second launch time,
wherein the second launch time occurs after the same first launch time.

6. The network entity of claim 1, wherein the one or more processors, to determine the respective launch times, are configured to:
determine that a first launch time for each flow in the first batch of flows and for a first flow of the second batch of flows is a first launch time; and
determine a second launch time for a second flow in the second batch of flows,
wherein the second launch time occurs after the first launch time.

7. The network entity of claim 1, wherein the one or more processors, to determine the respective launch times, are configured to:
determine a shortest execution time duration for each flow of the first batch of flows and for each flow of the second batch of flows by modeling candidate launch times, for the second batch of flows, in a piecewise linear function associated with the data flow model.

8. A method of communication performed by a network entity, comprising:
determining, based at least in part on a data flow model, a respective launch time for each flow of a first batch of flows and for each flow of a second batch of flows, such that an execution time duration for transferring at least one of the first batch of flows and the second batch of flows in a portion of a network is minimized; and
scheduling the first batch of flows and the second batch of flows based at least in part on the respective launch times;
wherein determining the respective launch times comprises:
determining, using a piecewise linear function, a gradient corresponding to a slope of the piecewise linear function of candidate launch times; and
determining, based at least in part on the gradient, a discontinuity of the piecewise linear function corresponding to the respective launch times.

9. The method of claim 8, wherein the data flow model comprises a bottleneck structure model of the portion of the network.

10. The method of claim 8, wherein determining the respective launch times comprises:
determining a first launch time for a first flow of the first batch of flows; and
determining a first launch time for a first flow of the second batch of flows, wherein the first launch time for the first flow of the second batch of flows occurs at a same time, or after, the first launch time for the first flow of the first batch of flows.

11. The method of claim 10, wherein determining the first launch time for the first flow of the second batch of flows comprises:
determining the first launch time for the first flow of the second batch of flows to be a time at which the first flow of the first batch completes.

12. The method of claim 8, wherein determining the respective launch times comprises:
determining that a first launch time for each flow in the first batch of flows is a same first launch time; and
determining that a second launch time for each flow in the second batch of flows is a second launch time,
wherein the second launch time occurs after the same first launch time.

13. The method of claim 8, wherein determining the respective launch times comprises:
determining that a first launch time for each flow in the first batch of flows and for a first flow of the second batch of flows is a first launch time; and
determining a second launch time for a second flow in the second batch of flows,
wherein the second launch time occurs after the first launch time.

14. The method of claim 8, wherein determining the respective launch times comprises:
determining a shortest execution time duration for each flow of the first batch of flows and for each flow of the second batch of flows by modeling candidate launch times, for the second batch of flows, in a piecewise linear function associated with the data flow model.

15. A non-transitory computer-readable medium storing a set of instructions for communication, the set of instructions comprising:
one or more instructions that, when executed by one or more processors of a network entity, cause the network entity to:
determine, based at least in part on a data flow model, a respective launch time for each flow of a first batch of flows and for each flow of a second batch of flows, such that an execution time duration for transferring at least one of the first batch of flows and the second batch of flows in a portion of a network is minimized; and
schedule the first batch of flows and the second batch of flows based at least in part on the respective launch times;
wherein the one or more instructions, that cause the network entity to determine the respective launch times, cause the network entity to:
determine, using a piecewise linear function, a gradient corresponding to a slope of the piecewise linear function of candidate launch times; and
determine, based at least in part on the gradient, a discontinuity of the piecewise linear function corresponding to the respective launch times.

16. The non-transitory computer-readable medium of claim 15, wherein the data flow model comprises a bottleneck structure model of the portion of the network.

17. The non-transitory computer-readable medium of claim 15, wherein the one or more instructions, that cause the network entity to determine the respective launch times, cause the network entity to:
determine a first launch time for a first flow of the first batch of flows; and
determine a first launch time for a first flow of the second batch of flows,
wherein the first launch time for the first flow of the second batch of flows occurs at a same time, or after, the first launch time for the first flow of the first batch of flows.

18. The non-transitory computer-readable medium of claim 17, wherein the one or more instructions, that cause the network entity to determine the first launch time for the first flow of the second batch of flows, cause the network entity to:
determine the first launch time for the first flow of the second batch of flows to be a time at which the first flow of the first batch completes.

19. The non-transitory computer-readable medium of claim 15, wherein the one or more instructions, that cause the network entity to determine the respective launch times, cause the network entity to:
determine that a first launch time for each flow in the first batch of flows is a same first launch time; and
determine that a second launch time for each flow in the second batch of flows is a second launch time,
wherein the second launch time occurs after the same first launch time.

20. The non-transitory computer-readable medium of claim 15, wherein the one or more instructions, that cause the network entity to determine the respective launch times, cause the network entity to:
determine that a first launch time for each flow in the first batch of flows and for a first flow of the second batch of flows is a first launch time; and
determine a second launch time for a second flow in the second batch of flows,
wherein the second launch time occurs after the first launch time.

21. The non-transitory computer-readable medium of claim 15, wherein the one or more instructions, that cause the network entity to determine the respective launch times, cause the network entity to:
determine a shortest execution time duration for each flow of the first batch of flows and for each flow of the second batch of flows by modeling candidate launch times, for the second batch of flows, in a piecewise linear function associated with the data flow model.

* * * * *